US008947561B2

(12) United States Patent
Oba et al.

(10) Patent No.: US 8,947,561 B2
(45) Date of Patent: Feb. 3, 2015

(54) CAPTURING DEVICE, CAPTURING SYSTEM AND CAPTURING METHOD

(75) Inventors: Eiji Oba, Tokyo (JP); Frédéric Maire, Ohnenheim (FR)

(73) Assignees: Sony Corporation, Tokyo (JP); Sony Europe Limited, Weybridge (GB)

(*) Notice: Subject to any disclaimer, the term of this patent is extended or adjusted under 35 U.S.C. 154(b) by 462 days.

(21) Appl. No.: 13/231,338

(22) Filed: Sep. 13, 2011

(65) Prior Publication Data
US 2012/0092530 A1     Apr. 19, 2012

(30) Foreign Application Priority Data

Oct. 14, 2010  (EP) ..................................... 10306116

(51) Int. Cl.
*H04N 5/262*  (2006.01)
*H04N 5/232*  (2006.01)

(52) U.S. Cl.
CPC ....... *H04N 5/23245* (2013.01); *H04N 5/23293* (2013.01)
USPC ...................................... 348/240.2; 348/148

(58) Field of Classification Search
CPC . H04N 5/23296; H04N 5/2628; H04N 5/232; H04N 3/1562; H04N 5/23293
USPC .............................. 348/148, 240.2
See application file for complete search history.

(56) References Cited

U.S. PATENT DOCUMENTS

| 4,963,981 A * | 10/1990 | Todaka et al. ............... 348/240.2 |
| 7,952,620 B2 * | 5/2011 | Yoshino ..................... 348/240.2 |
| 8,279,279 B2 * | 10/2012 | Hattori et al. ................. 348/148 |
| 2007/0098396 A1 | 5/2007 | Watanabe et al. |
| 2008/0239132 A1 | 10/2008 | Kohama |
| 2009/0153649 A1 | 6/2009 | Hirooka et al. |
| 2010/0201817 A1 * | 8/2010 | Katoh ........................... 348/148 |

FOREIGN PATENT DOCUMENTS

| EP | 1981262 | 10/2008 |
| JP | 2002 19556 | 1/2002 |

* cited by examiner

*Primary Examiner* — Twyler Haskins
*Assistant Examiner* — Fayez Bhuiyan
(74) *Attorney, Agent, or Firm* — Frommer Lawrence & Haug LLP; William S. Frommer

(57) ABSTRACT

A capturing device includes an image sensor that generates an image signal by performing photoelectric conversion for light from a subject, a control unit that generates a setting value for setting a range where an image resulting from the image signal is cut, based on a first instruction input from a user, a setting value storage unit that stores the setting value generated by the control unit, an image conversion unit that reads the setting value from the setting value storage unit, and cuts a specific region specified by the setting value from the image and enlarges the cut region, when there is a second instruction input from the user, and an output unit that converts a signal of the image cut and enlarged by the image conversion unit into an image signal of a predetermined format and outputs the converted image signal.

17 Claims, 16 Drawing Sheets

FIG. 3
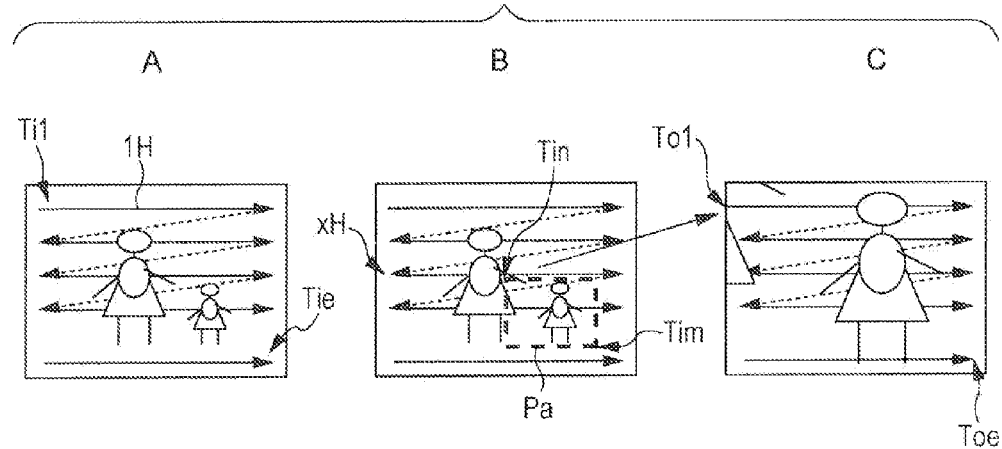
Tie − Ti1 = 1V VALID PERIOD
Tim − Tin : VARIABLE BY CUT REGION
Toe − To1 = 1V VALID PERIOD
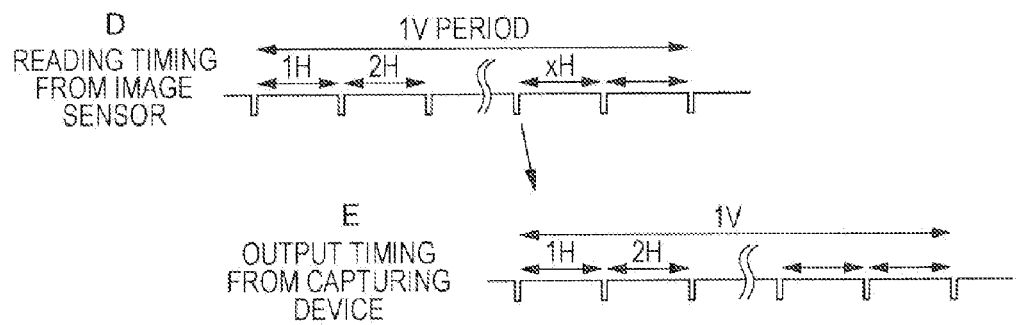

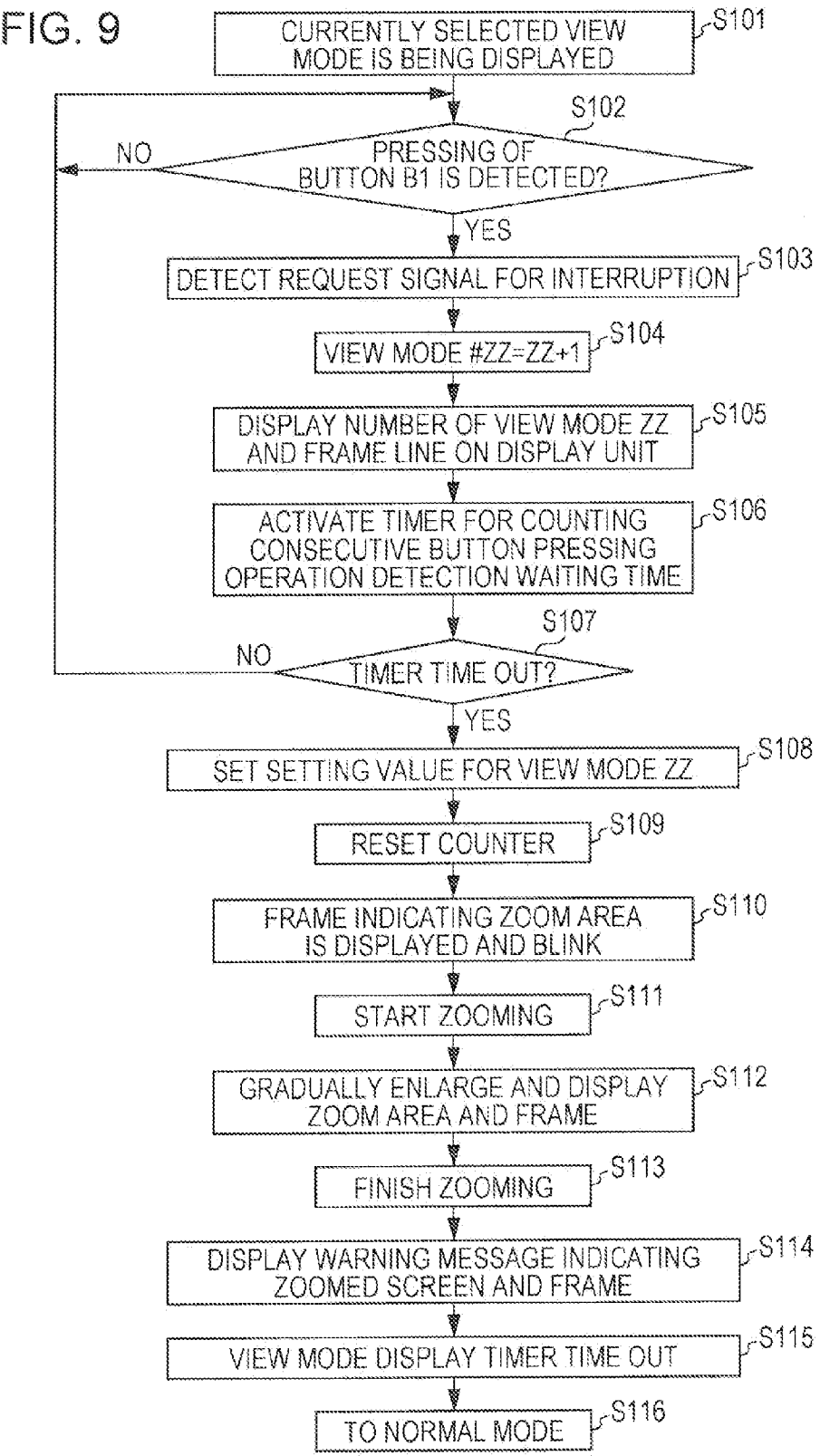

CAPTURING DEVICE, CAPTURING SYSTEM AND CAPTURING METHOD

BACKGROUND OF THE INVENTION

1. Field of the Invention

The present invention relates to a capturing device, a capturing system having the capturing device, and a capturing method applied to the capturing device or the capturing system, which are suitable for application to, for example, a vehicle equipped camera.

2. Description of the Related Art

In the related art, a miniature camera is equipped in vehicles such as automobiles or trains, and a picture taken by the camera is displayed on a display device installed in the vicinity of a driver's seat or the like. (For example, refer to Japanese Unexamined Patent Application Publication No. 2002-19556). This camera photographs a place which is difficult for a driver to view during driving, and can make the place which is difficult for the driver to view into a place which is easily viewed by displaying obtained images on the display device. As the place which is difficult for the driver to view, for example, in the case of an automobile vehicle, there are many cases where a rear side or the like of the vehicle is set in consideration of moving backwards during parking.

SUMMARY OF THE INVENTION

However, as described above, in the case where the place which is difficult to view is set fixedly, there is a problem in that although the driver intends to gaze a specific local place, it is difficult to confirm a detailed picture of the place through an image taken by the camera.

It is desirable to easily confirm an image of a local place or the like which a driver (user) intends to particularly gaze.

According to an embodiment of the invention, an image sensor generates an image signal by performing photoelectric conversion for light from a subject, and a control unit generates a setting value for setting a range where an image resulting from the image signal is cut, based on a first instruction input from a user. A setting value storage unit stores the setting value generated by the control unit. An image conversion unit reads the setting value from the setting value storage unit, and cuts a region specified by the setting value from the image and enlarges the cut region, when there is a second instruction input from the user. In addition, an output unit converts a signal of the image cut and enlarged by the image conversion unit into an image signal of a predetermined format and outputs the converted image signal.

Thereby, when there is the first instruction input from the user, a setting value for setting a region where an image resulting from the image signal is cut is generated and stored. Also, when there is the second instruction input from the user, a region specified by the setting value is cut from the image and enlarged to be output.

According to the invention, it is possible to store a place (range) or the like which a user intends to particularly gaze as a setting value, and to cut and enlarge the place so as to be output to an external display device or the like, at a timing when there is an instruction input from a user. Therefore, the user can easily confirm an image of a local place or the like which the user intends to particularly gaze.

Various respective aspects and features of the invention are defined in the appended claims.

BRIEF DESCRIPTION OF THE DRAWINGS

Embodiments of the invention will now be described with reference to the accompanying drawings, throughout which like parts are referred to by like references, and in which:

FIG. 3 is an explanatory diagram illustrating an example of a process by a timing adjustment unit according to an embodiment of the invention, wherein A shows an example of a reading timing of an image signal from an image sensor, B shows an example of a specific region, C shows an example of an output timing of a cut region as the specific region, D shows a reading timing of an image signal from the image sensor, and E shows an example of an output timing of an image signal from a capturing device.

FIG. 9 is a flowchart illustrating an example of a reading and enlarging process of a specific region according to an embodiment of the invention.

FIGS. 10A to 10D are explanatory diagrams illustrating a display example of a specific region according to an embodiment of the invention, wherein FIG. 10A shows an example of a display screen at a distant place mode, FIG. 10B shows a display example of a specific region before enlargement, FIG. 10C shows a display example when the specific region is enlarged, and FIG. 10D shows a display example of the specific region after enlargement.

DESCRIPTION OF THE PREFERRED EMBODIMENTS

Hereinafter, an embodiment of the invention (hereinafter, also referred to as "this example") will be described: The description will be made in the following order.

1. An embodiment (an example of receiving an operation using two buttons)
2. A modified example 1 (an example of receiving an operation using one button)
3. A modified example 2 (an example of displaying an image of a specific region registered by a user on a small screen of PinP (picture-in-picture))
1. An embodiment (an example of receiving an operation using two buttons)

An Entire Configuration Example of a Capturing System

Figure 1:
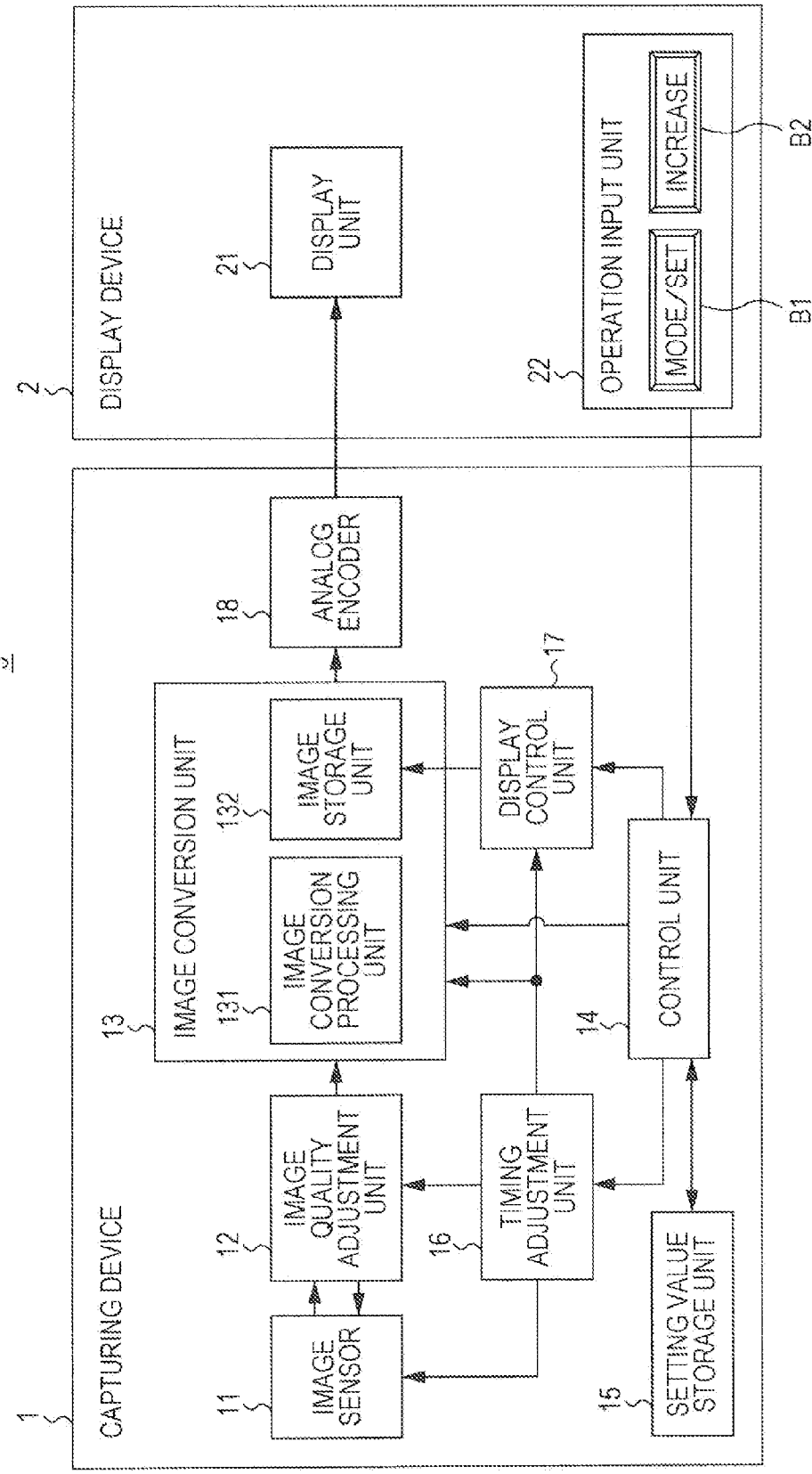
FIG. 1 is a block diagram illustrating a configuration example of a capturing system according to an embodiment of the invention.

FIG. 1 is a configuration example of a capturing device 1 and a display device 2 as an embodiment of a capturing system of the invention. In this example, it will be described that the capturing device 1 is applied to a vehicle equipped camera installed in a rear side of an automobile vehicle (not shown), and the display device 2 is applied to a display device of a car navigation device installed in the car. It is assumed that the capturing device 1 and the display device 2 are connected to each other via a cable (not shown) or the like, an image signal is input to the display device 2 from the capturing device 1, and a control signal is input to the capturing device 1 from the display device 2.

In addition, in this example, by the capturing system 5 configured in this way, a specific region which a user intends to particularly gaze is set in advance as a presetting, and an image of the preset region is enlarged and displayed by being cut based on an instruction input from the user. In the following description, a mode for registering or reading the specific region is referred to as "a personal view mode," and a mode for displaying an image taken by the capturing device 1 as it is, is referred to as "a normal mode."

This example shows an example where the capturing device 1 is equipped in an automobile, but is not limited thereto. In other words, the capturing device 1 of the invention may be equipped in other vehicles such as a train, heavy machinery such as a movable crane, a yacht, or the like.

First, the respective units constituting the display device 2 are described. The display device 2 includes a display unit 21 and an operation input unit 22. The display unit 21 is constituted by, for example, an LCD (liquid crystal display) or the like, and displays an image signal transmitted from the capturing device 1 as an image. The operation input unit 22 is constituted by two buttons, a selection and fixity button B1 and a value input button B2, and generates a control signal corresponding to contents of a button pressing operation of a user for supply to the capturing device 1.

Particularly, when the selection and fixity button B1 and the value input button B2 are simultaneously pressed for a long time by the user, the operation input unit 22 generates a request signal for interruption used for transition to a setting menu of the "personal view mode" and supplies the request signal for interruption to the capturing device 1. When the selection and fixity button B1 is pressed twice consecutively by the user (first instruction input), the operation input unit 22 generates a control signal for each time, and fixes a control setting value used for a cut position of an image or a partial enlargement thereof so as to be supplied to the capturing device 1. Also, the operation input unit 22 performs settings used for a unique display by the "personal view mode." In the capturing device 1 entering a state where the "personal view mode" is set, when the pressing of the selection and fixity button B1 is detected, the operation is regarded as a second instruction input and a control signal for reading an image of a region set as the "personal view mode" is generated.

Although, in the example shown in FIG. 1, the display device 2 is constituted by the display unit 21 and the operation input unit 22 which are provided independently from each other, the display device 2 may be applied to a display device employing a touch panel where the display unit 21 and the operation input unit 22 are formed as a single body.

Next, the respective units constituting the capturing device 1 will be described. The capturing device 1 includes an image sensor 11, an image quality adjustment unit 12, an image conversion unit 13, a control unit 14, a setting value storage unit 15, a timing adjustment unit 16, a display control unit 17 and an analog encoder 18 (output unit).

The image sensor 11 is constituted by a solid-state imaging device such as, for example, a CCD (charge coupled device image sensor) or a CMOS (complementary metal oxide semiconductor image sensor). The image sensor 11 performs photoelectric conversion for light from a subject formed on a wide-angle lens (not shown) to thereby generate an image signal. The image sensor 11 supplies the image signal obtained by the image sensor 11 to the image quality adjustment unit 12. The image quality adjustment unit 12 converts the supplied image signal into a digital image signal and performs an image quality adjustment for the digital image signal.

The image quality adjustment performs, for example, AGC (automatic gain control), noise reduction, or an image quality enhancement process. The image signal having undergone the image quality adjustment in the image quality adjustment unit 12 is supplied to the image conversion unit 13. Also, the image quality adjustment unit 12 controls the driving of the image sensor 11.

The image conversion unit 13 includes an image conversion processing unit 131 and an image storage unit 132, and converts and adjusts an image to have a standard output format of an image, for example, a format for being output by an NTSC (national television system committee) system or the like. The image conversion processing unit 131 cuts an image corresponding to a specific region in the image resulting from the image signal supplied from the image quality adjustment unit 12 under the control of the control unit 14, and enlarges the cut image to a size of a screen of the display unit 21 of the display device 2. The cut and enlarged image is output to the image storage unit 132. The image storage unit 132 is a frame memory which stores image signals supplied from the image conversion processing unit 131 during a predetermined period of time.

The control unit 14 is constituted by, for example, an MPU (micro-processing unit) or the like, and generates a setting value for specifying a range of the above-described "specific region" based on a content of a control signal output from the operation input unit 22 so as to be stored in the setting value storage unit 15. The setting value for specifying a range of the "specific region," that is, the setting value of the "personal view mode" is defined by the "first instruction input" as described above. This setting value is a setting value for designating a range of cutting the image resulting from the image signal supplied from the image quality adjustment unit 12. The setting value is a zoom magnification setting in zoom-displaying the specific region, and X and Y axis coordinates of the specific region. The control unit 14 has a counter (not shown) which counts the number of pressings of the value input button B2 of the display device 2, and a timer which measures time. When the second instruction input is input to the operation input unit 22, the control unit 14 reads the setting value from the setting value storage unit 15 so as to be output to the image conversion unit 13. The control unit 14 generates a control signal for controlling an image signal output timing from the image sensor 11 and an image signal output timing from the image storage unit 132, and supplies the control signal to the timing adjustment unit 16. The control unit 14 generates a control signal used to output an image signal, which is converted into an image by the image conversion processing unit 131, to the analog encoder 18, and supplies the control signal to the image conversion processing unit 131.

The setting value storage unit 15 is constituted by, for example, an EEPROM (electrically erasable programmable ROM) or the like, and stores setting values generated by the control unit 14, factory default data, or image conversion data converted by the image conversion unit 13. The configuration of the setting value storage unit 15 will be described later in detail with reference to FIG. 2.

The timing adjustment unit 16 adjusts the image signal output timing from the image sensor 11 and the image signal output timing from the image storage unit 132 based on the control signal supplied from the control unit 14. The timing adjustment unit 16 will be described later in detail with reference to FIG. 3.

The display control unit 17 reads images stored in the image storage unit 132 according to the timings adjusted by the timing adjustment unit 16 based on the control signal supplied from the control unit 14, and outputs the read images to the analog encoder 18. In addition, the display control unit 17 generates a frame line for setting a specific region, or a surrounding frame or the like which surrounds a later-described specific region so as to be output to the analog encoder 18. The analog encoder 18 converts an image signal output from the image conversion unit 13 to a picture signal such as, for example, the NTSC system so as to be supplied to the display unit 21 of the display device 2. The timing adjustment unit 16 delays all the image frames regardless of whether or not an image is cut, such that an image is output at a timing satisfying a vertical ("V") synchronization based on a timing of the NTSC. The timing adjustment unit 16 adjusts decompression of a reading timing of an image signal from the image sensor 11 and an output timing of an image signal from the image conversion unit 13.

A Configuration Example of the Setting Value Storage Unit

Figure 2:
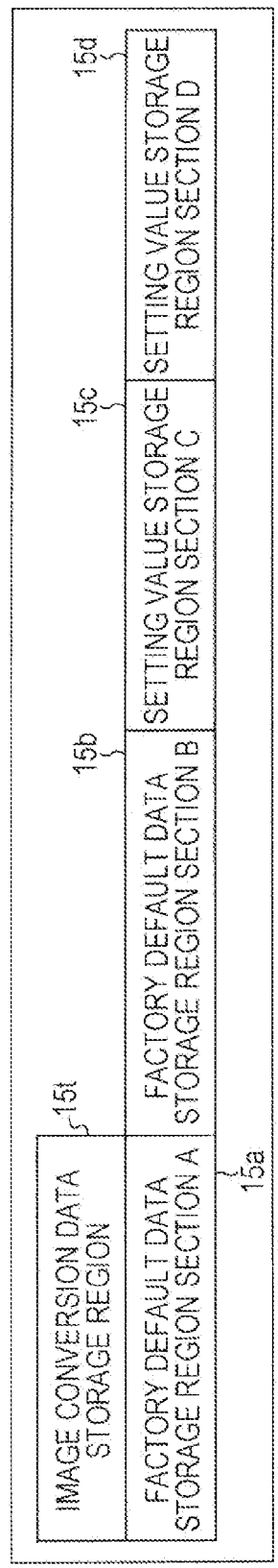
FIG. 2 is an explanatory diagram illustrating a configuration example of a setting value storage unit according to an embodiment of the invention.

With reference to FIG. 2, a configuration example of the setting value storage unit 15 will be described. The setting value storage unit 15 includes an image conversion data storage region 15t, a factory default data storage region 15a, factory default data storage region 15b, a setting value storage region 15c, and a setting value storage region 15d. The image conversion data storage region 15t stores and maintains a standard setting value which is commonly set for controlling the camera by the image conversion setting value to be applied to a displayed frame image, and reflects the setting value on the control of the control unit 14 according to one of data stored in the following factory default data storage regions 15a and 15b and setting value storage regions 15c and 15d which maintain the "personal view mode" or the like, in response to an operation of the second instruction input. The factory default data storage regions 15a and 15b store factory default data. The factory default data is stored in both sections of the factory default data storage regions 15a and 15b, and thus when problems occur, the recovery can be made using data stored in one of the two.

The setting value storage regions 15c and 15d store setting values for designating a specific region which is set at the "personal view mode." As the setting values for designating a specific region, there are an X coordinate and a Y coordinate of the specific region, or zoom magnification when the specific region is zoomed and displayed. These setting values are registered in two to three kinds and the like, that is, in plural kinds. For example, setting values for specifying specific regions, such as a view mode #1 set at a home parking lot, a view mode #2 set at a workplace parking lot, and the like, may be registered in plural kinds.

Generated and changed setting values are alternately written in the setting value storage region 15c and the setting value storage region 15d. By doing this, even when problems such as temporary blackout happen in the course of writing or renewal of setting values, the recovery can be made using setting values before the change, which are stored in one of the two storage regions. Also, in this example, the number of setting value storage regions 15 is two, but is not limited thereto. The number of setting value storage regions may be three, four, or more.

An Example of a Timing Adjustment Process by the Timing Adjustment Unit 16

Next, with reference to FIG. 3, an example of a timing adjustment process by the timing adjustment unit 16 will be described. A of FIG. 3 shows a reading timing of an image signal from the image sensor 11. In A of FIG. 3, a timing when a first pixel (a pixel positioned at the top left of the screen) of pixels constituting one frame is read is denoted by a timing Ti1, and a timing when a last pixel (a pixel positioned at the bottom right of the screen) thereof is read is denoted by a timing Tie. After the first pixel is read at the timing Ti1, during one horizontal scanning period 1H, pixels corresponding to the amount of one line up to the right end of the screen are sequentially read. From the second line following the first line to the last line, pixels are consecutively read, and thereby the pixels corresponding to the amount of one frame are all read. In other words, in the reading of the image signal from the image sensor 11 shown in A of FIG. 3, the period calculated by (the timing Tie—the timing Ti1) is 1V valid period.

B of FIG. 3 shows an example of a region set as a specific region Pa at the "personal view mode." In B of FIG. 3, the specific region Pa is marked with the broken lines, a timing when a pixel positioned at the top left of the specific region Pa is read is denoted by a timing Tin, and a timing when a pixel positioned at the bottom right is read is denoted by a timing Tim. The period calculated by (the timing Tim—the timing Tin) is changed by the size of the specific region Pa. In this example, an image of the specific region Pa is cut, and the cut image is output to the display device 2 during the 1V valid period.

C of FIG. 3 shows an example of an output timing of an image to the display device 2. In C of FIG. 3, an output timing of a first pixel is denoted by a timing To1, and an output timing of a last pixel is denoted by a timing Toe. When the image of the specific region Pa shown in B of FIG. 3 is output during the 1V valid duration expressed by (the timing Toe—the timing To1), it is necessary to delay the output of the image of the specific region Pa to the 1V valid period. In addition, the output timing of the image signal from the capturing device 1 shown in E of FIG. 3 is delayed by a predetermined time with respect to the reading timing from the image sensor 11 shown in D of FIG. 3 so as to add a delay taken for the image quality adjustment unit 12 to adjust image quality.

The timing adjustment unit 16 adjusts the reading timing of the image signal from the image sensor 11 or the reading timing of the cut image from the image storage unit 132 in order to realize the delayed output of the specific region Pa.

An Operation Example of Initial Setting of the Capturing System

Next, with reference to flowcharts in FIGS. 4 to 9, an operation example of setting the "personal view mode" in the capturing system 5 in this example will be described. First, an operation example of setting the specific region Pa will be described with reference to FIGS. 4 to 8, and then an operation example of reading the specific region Pa will be described with reference to FIG. 9.

Figure 4:
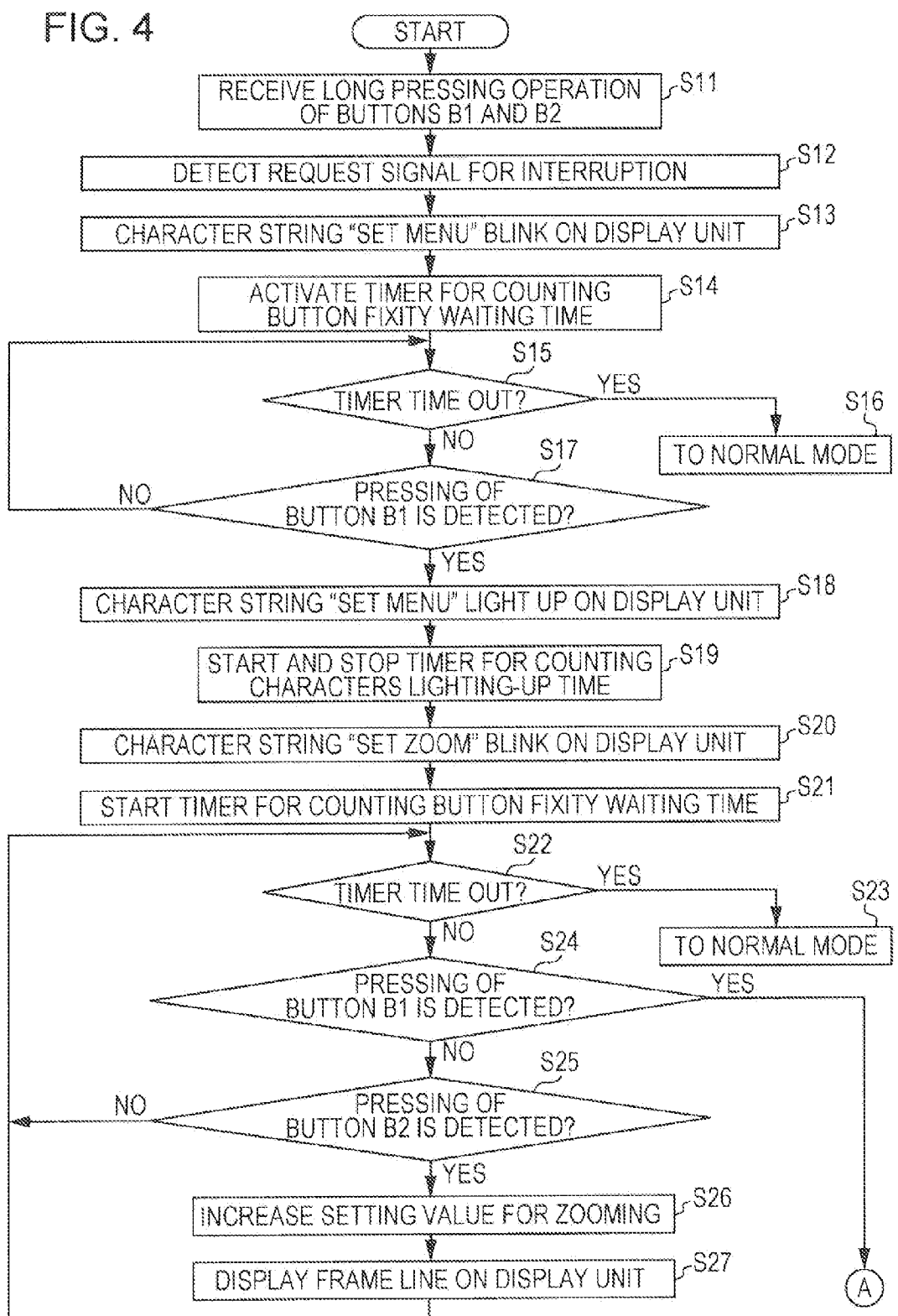
FIG. 4 is a flowchart illustrating an example of a zoom magnification setting for a specific region according to an embodiment of the invention.

As shown in FIG. 4, first, if the selection and fixity button B1 and the value input button B2 (see FIG. 1) of the display device 2 are simultaneously pressed long (step S11), this operation enables the control unit 14 to detect the request signal for interruption generated by the operation input unit 22 (step S12). The request signal for interruption is used to request transition to the "personal view mode" setting state. Also, a character string "SET MENU" blinks on the screen of the display unit 21 of the display device 2 under the control of the control unit 14 (step S13). The correspondence of an operation input by a user with a screen display by the display unit 21 will be described later with reference to FIGS. 11 to 18.

A time for detecting the long pressing of the selection and fixity button 61 and the value input button B2 is set to, for example, 3 seconds to 10 seconds or the like. Even when the selection and fixity button B1 and the value input button B2 are pressed together, if a pressing time is shorter than a time set as the time for detecting the long pressing, this is regarded as a wrong operation and thus the request signal for interruption is not generated.

Next, the control unit 14 activates a timer for counting a button fixity waiting time (step S14), and determines whether or not the timer times out (step S15). This timer is a timer used to return to the normal mode as non-operation of buttons, when an operation of the selection and fixity button B1 and the value input button B2 are not performed. The setting value of the timer may be, for example, 10 seconds to 120 seconds, or the like.

At step S15, when the timer is determined to have timed out, the process returns to the normal mode (step S16). In addition, when the process returns to the normal mode, the activated timers all stop to clear their count values. While the timer has not timed out, it is determined whether or not pressing of the selection and fixity button B1 is detected (step S17). If the pressing of the selection and fixity button B1 is not detected, the process returns to step S15 where the determination continues to be performed. If the pressing of the selection and fixity button B1 is detected, the character string "SET MENU" which is blinking on the screen of the display unit 21 lights up (step S18). The character string on the screen is changed from the blinking state to the lighting-up state, and thereby a user can sense that a content indicated by the character string is fixed. In this example, the user can grasp that "SET MENU," that is, a function of setting a menu is validated. The "personal view mode" is settable through the above-described steps. Also, through these steps, it is possible to prevent a wrong operation, and unintended operation, or an unprepared change of settings due to an error in touching the buttons.

If a timer for counting a character lighting-up time starts and stops (step S19), a character string "SET ZOOM" blinks on the display unit 21 (step S20). The timer for counting a character lighting-up time is used to count a time when the lighting-up state is maintained, after the display of the character string is changed to the lighting-up state from the blinking state. The time when the lighting-up state is maintained is for notifying the user of the fixity of the content selected by the user, which is thus set to, for example, 0.5 to 2 seconds.

After the character string "SET ZOOM" blinks, a timer for counting a button fixity waiting time starts (step S21), and it is determined whether or not the timer times out (step S22). When the timer is determined to have timed out, the process returns to the normal mode (step S23). While the timer has not timed out, it is determined whether or not pressing of the selection and fixity button B1 is detected (step S24). When the pressing of the selection and fixity button B1 is detected, the process goes to a connector A.

When the pressing of the selection and fixity button B1 is not detected at step S24, it is determined whether or not pressing of the value input button B2 is detected (step S25). When the pressing of the value input button B2 is not detected, the process returns to step S22 where the determination continues to be performed. When the pressing of the value input button B2 is detected, a setting value for the zoom magnification is increased (step S26). The increase in the zoom magnification is performed by a step width from preset minimum value to maximum value, for example, 8 to 32 step widths, in the cyclic (circulated) manner. That is to say, each time the value input button B2 is pressed once, the zoom magnification is increased by the predetermined step width. If the increased zoom magnification exceeds the maximum value, it returns to the minimum value again.

After the setting value for the zoom magnification is increased at step S26, a frame line indicating a range of the specific region Pa is displayed on the screen of the display unit 21 (step S27), and the process returns to step S22. The size of the frame line varies in conjunction with the size of the zoom magnification.

Figure 5:
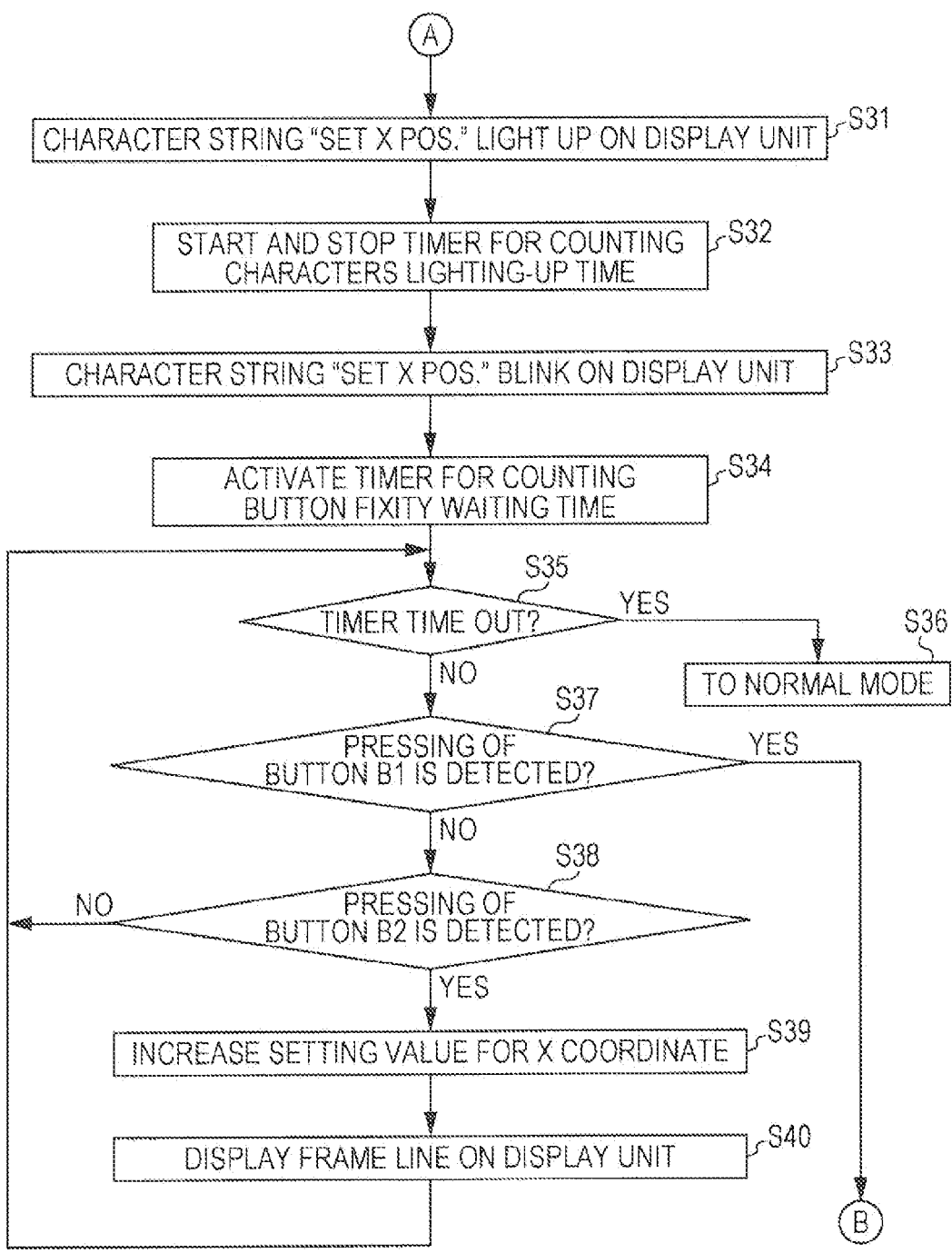
FIG. 5 is a flowchart illustrating an example of an X axis coordinate setting for a specific region according to an embodiment of the invention.

A process after the connector A will be described with reference to the flowchart in FIG. 5. When the pressing of the selection and fixity button B1 is detected at step S24 in FIG. 4, that is, when the operation of fixing the setting value for the zoom magnification is performed, a character string "SET X POS." lights up on the screen of the display unit 21 (step S31). In other words, there is a transition to a menu for setting an X coordinate of the specific region Pa. Subsequently, if the timer for counting a character lighting-up time starts and stops (step S32), the character string "SET X POS." on the screen of the display unit 21 blinks (step S33).

Next, the timer for counting a button fixity waiting time starts (step S34) and it is determined whether or not the timer times out (step S35). When the timer is determined to have timed out, the process returns to the normal mode (step S36). While the timer has not timed out, it is determined whether or not pressing of the selection and fixity button B1 is detected (step S37). If the pressing of the selection and fixity button B1 is detected, the process goes to a connector B. If the pressing of the selection and fixity button B1 is not detected, it is determined whether or not pressing of the value input button B2 is detected (step S38). If the pressing of the value input button B2 is not detected, the process returns to step S35 where the determination continues to be performed. If the pressing of the value input button B2 is detected, the setting value for the X coordinate is increased (step S39). The increase is also here performed in the circulated manner like the setting of the zoom magnification.

After the setting value for the zoom magnification is increased at step S39, a frame line indicating a range of the specific region Pa is displayed on the screen of the display unit 21 (step S40), and the process returns to step S35. The frame line alters its arrangement position when a value of the X coordinate is increased. Specifically, each time the value input button B2 is pressed, the frame line moves rightwards on the screen at a predetermined step width, and upon reaching the right end of the screen, the frame line moves the left end of the screen, and the frame line moves rightwards again.

Figure 6:
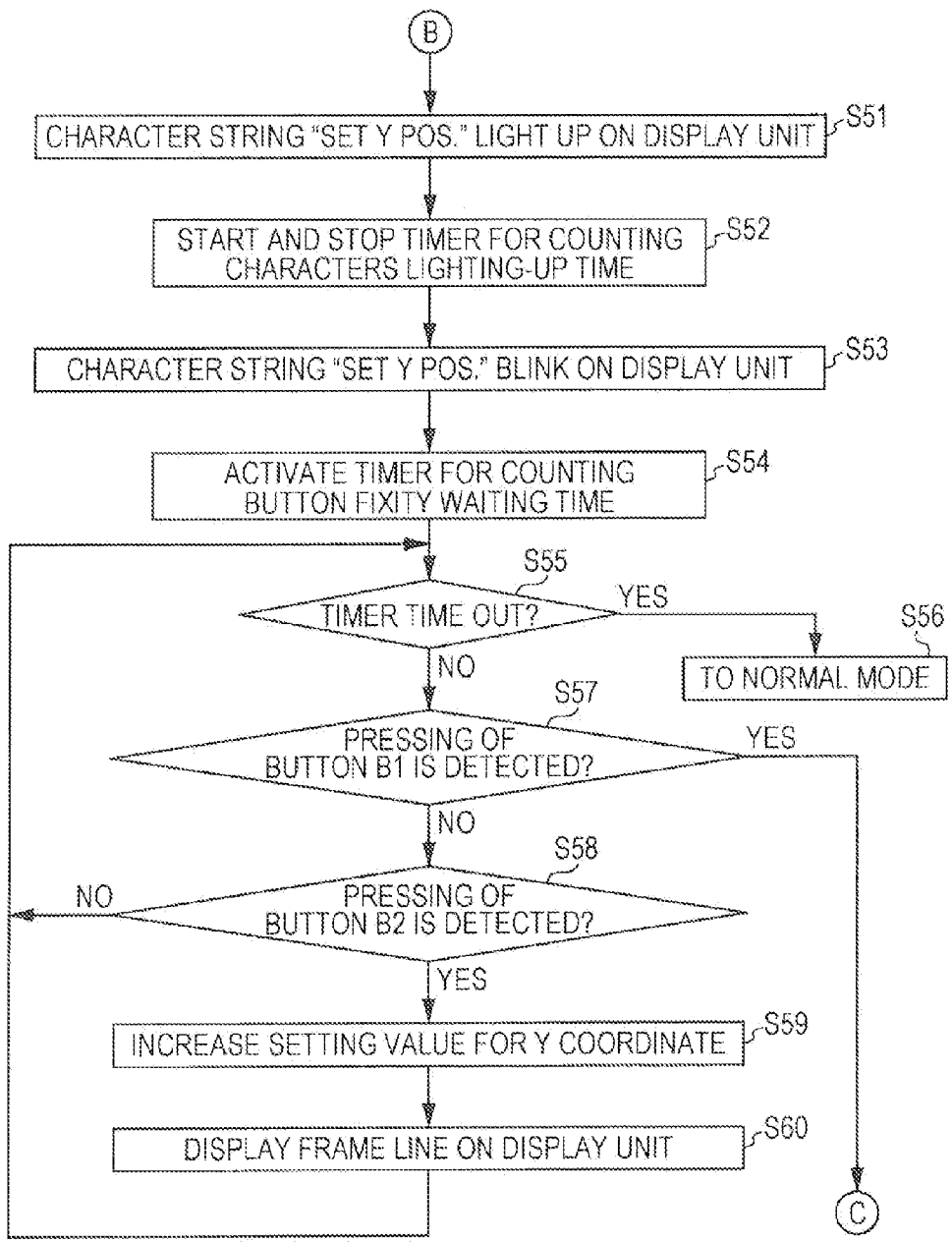
FIG. 6 is a flowchart illustrating an example of a Y axis coordinate setting for a specific region according to an embodiment of the invention.

Next, a process after the connector B will be described with reference to the flowchart in FIG. 6. When the pressing of the selection and fixity button 61 is detected at step S37 in FIG. 5, that is, when an operation of fixing the setting value for the X coordinate is performed, a character string "SET Y POS." lights up on the screen of the display unit 21 (step S51). In other words, there is a transition to a menu for setting a Y coordinate of the specific region Pa. Next, if the timer for counting a character lighting-up time starts and stops (step S52), the character string "SET Y POS." blinks on the screen of the display unit 21 (step S53).

Next, the timer for counting a button fixing waiting time starts (step S54), and it is determined whether or not the timer times out (step S55). If the timer is determined to have timed out, the process returns to the normal mode (step S56). While the timer has not timed out, it is determined whether or not pressing of the selection and fixity button B1 is detected (step S57). When the pressing of the selection and fixity button B1 is detected, the process goes to a connector C. When the pressing of the selection and fixity button B1 is not detected, it is determined whether or not the value input button B2 is detected (step S58). When the pressing of the value input button B2 is not detected, the process returns to step S55 where the determination continues to be performed. When the pressing of the value input button B2 is detected, the setting value for the Y coordinate is increased (step S59). The increase is also here performed in the circulated manner like the setting of the zoom magnification or the setting of the X coordinate.

After the setting value for the zoom magnification is increased at step S59, a frame line indicating a range of the specific region Pa is displayed on the screen of the display unit 21 (step S60), and the process returns to step S55. The frame line alters its arrangement position when a value of the Y coordinate is increased. Specifically, each time the value input button B2 is pressed, the frame line moves upwards on the screen at a predetermined step width, and upon reaching the uppermost part of the screen, the frame line moves to the lowermost part of the screen, and the frame line moves upwards again.

Figure 7:
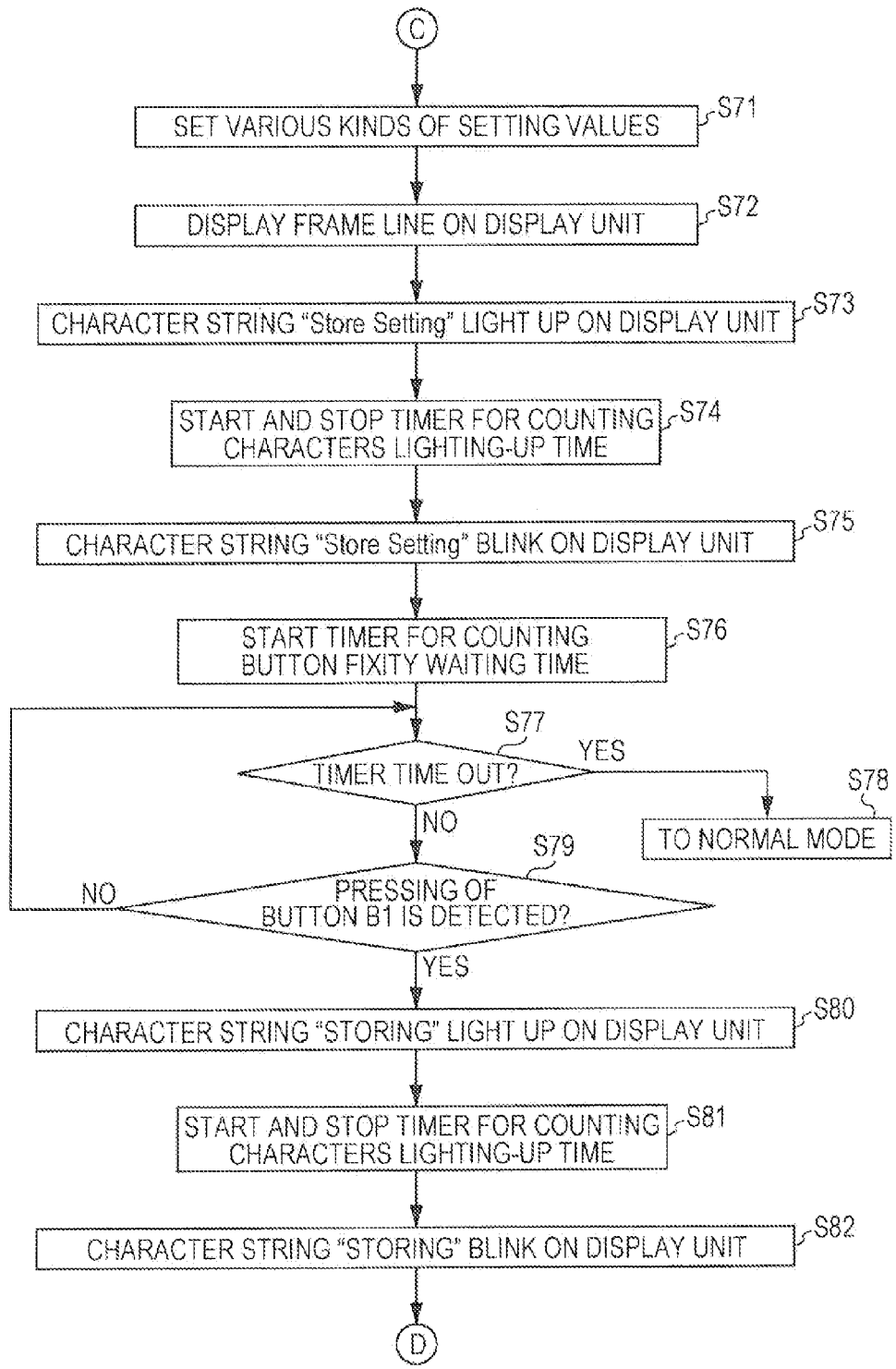
FIG. 7 is a flowchart illustrating an example of a setting storage process for a specific region according to an embodiment of the invention.

A process after the connector C will be described with reference to the flowchart in FIG. 7. First, if various kinds of setting values for the zoom magnification and others are set (step S71), a frame line indicating a region set as the specific region Pa is displayed on the screen of the display unit 21 (step S72). A character string "Store Setting" lights up on the same screen (step S73). Next, if the timer for counting a character lighting-up time starts and stops (step S74), the character string "Store Setting" on the display unit 21 blinks (step S75).

Next, the timer for counting a button fixity waiting time starts (step S76), and it is determined whether or not the timer times out (step S77). If the timer is determined to time out, the process returns to the normal mode (step S78). While the timer does not time out, it is determined whether or not the pressing of the selection and fixity button B1 is detected (step S79). If the pressing of the selection and fixity button B1 is detected, a character string "STORING" meaning "storage" lights up on the screen of the display unit 21 (step S80). Successively, if the timer for counting a character lighting-up time starts and stops (step S81), the character string "STORING" on the display unit 21 blinks (step S82), and the process goes to a connector D.

Figure 8:
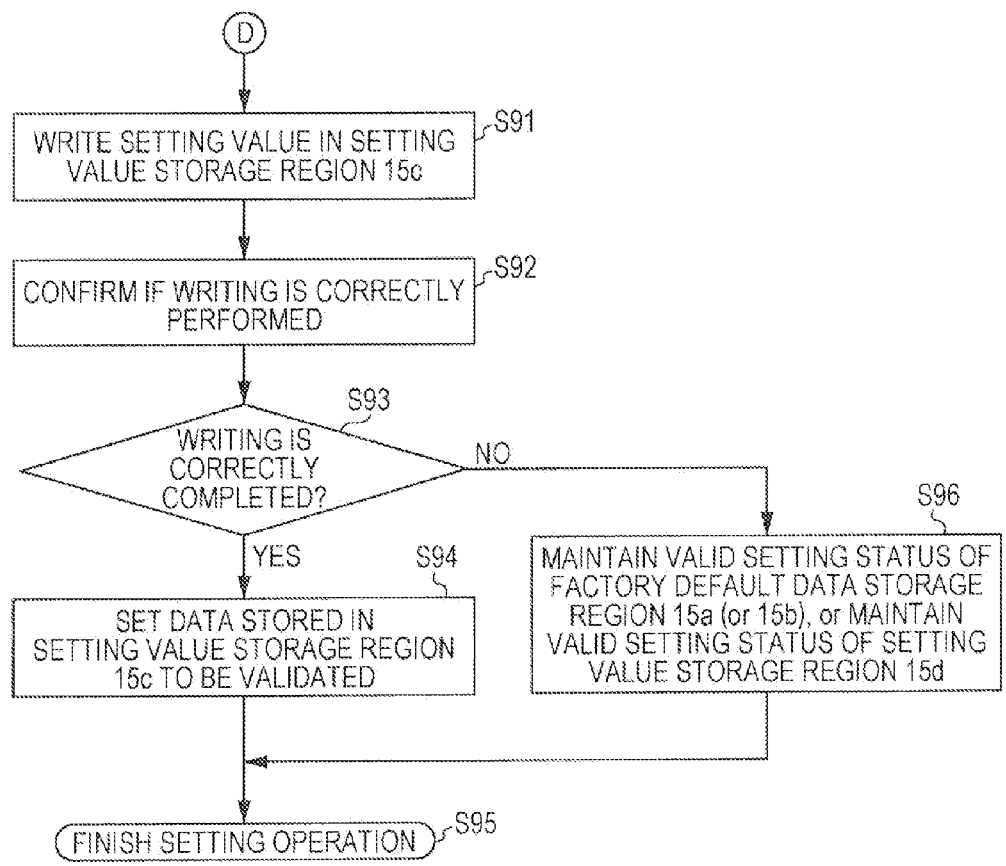
FIG. 8 is a flowchart illustrating an example of a writing process of a specific region in the setting value storage unit according to an embodiment of the invention.

FIG. 8 shows a process where the setting value information for the specific region Pa set by a user at the above-described steps is written in the setting value storage unit 15. To begin with, if the setting value information for the specific region Pa is written in the setting value storage region 15c (see FIG. 1) (step S91), it is confirmed whether or not the writing is correctly performed (step S92). Specifically, checksum of data written in the setting value storage region 15c is calculated. Next, it is determined whether or not the writing of the setting values is correctly finished (step S93), and if the writing is correctly finished, the data stored in the setting value storage region 15c is set to be validated (step S94), and the setting operation is finished (step S95).

If the writing of the setting values is not correctly finished, the valid setting status of the factory default data storage region 15a (or 15b) is maintained, or the valid setting status of the setting value storage region 15d is maintained (step S96). In other words, the factory default is validated, or the data in the setting value storage region 15d where the previous setting values are written is validated. Whether the factory default data is validated or the data in another section of the setting value storage regions is validated is determined depending on each situation.

An Operation Example at the Normal Mode of the Capturing System

FIG. 9 is a flowchart illustrating a process (the second instruction input) when a picture of the specific region Pa is displayed in a state where the normal mode, or other modes, for example, a distant place mode for displaying a picture of a distant place is displayed (the personal view mode is activated).

Figure 10A:
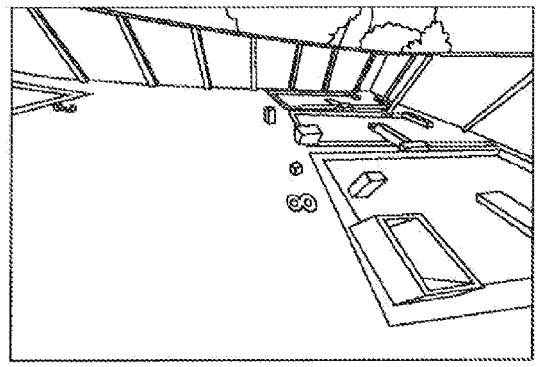

As shown in FIG. 10A, in the state where a mode such as the distant place mode is displayed (step S101 in FIG. 9), it is determined whether or not the selection and fixity button B1 is pressed (step S102). While the pressing of the selection and fixity button B1 is not detected, the determination at step S102 continues to be performed. If the pressing of the selection and fixity button B1 (the second instruction input) is detected, this operation enables the control unit 14 to detect the request signal for interruption generated by the operation input unit 22 (step S103).

The control unit 14 increases the management number (#) ZZ of the personal view mode (in the flowchart, abbreviated to "a view mode") by one (step S104). The number of the personal view mode ZZ increased at step S104 and the frame line indicating the specific region Pa are displayed on the screen of the display unit 21 (step S105).

Next, a timer for counting a consecutive button pressing operation detection waiting time is activated (step S106), and it is determined whether or not the timer times out (step S107). The timer for counting a consecutive button pressing operation detection waiting time is a timer used to measure a time when a consecutive button pressing operation by a user is counted. The number of the consecutive button pressing operation detected during the activation of the timer is counted and added up, and the added-up value is reflected on a register.

While the timer is not determined to time out at step S107, the process returns to step S102 where the determination continues to be performed. If the timer is determined to time out, the setting value for the personal view mode #ZZ is set to the register (step S108), and a value of the counter which is counting the consecutive button pressing operation is reset (step S109). In other words, while a user continues to press a button, the personal view mode # is increased in conjunction with the pressing of the button, and the management number and the frame line of the specific region Pa managed by the management number are displayed on the screen of the display unit 21. Thereby, the user can confirm registered plural pieces of information for the specific region Pa on the screen by consecutively pressing the selection and fixity button B1. At a point of time when the users stops the consecutive pressing of the button (a point of time when the timer times out), a setting of the personal view mode # displayed at that time is read and displayed on the screen.

In addition, when the selection and fixity button B1 is pressed by the user again after the transition to the personal view mode, the screen of the normal mode is displayed. This is because when the button pressing operation is received again after a predetermined time has elapsed, if the information (added-up value of the counter) fixed by the previous consecutive button pressing operation is successively displayed on the screen, the user is apt to be frustrated. Specifically, there is concern regarding the fact that it takes time for the user to think of the contents of the previous operation. In order to prevent this situation, in this example, at the time of the transition to the personal view mode, the value of the counter is reset, and the setting is made to be changed from the screen of displaying the normal mode. In other words, by displaying the screen where the whole situation can be grasped at a glance before the operation of changing to the partially enlarged screen set in the personal view mode, a decrease in the causes leading to accidents can be expected.

Figure 10B:
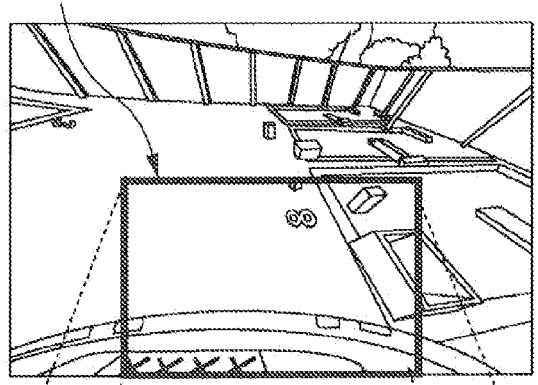

The description will be made with reference to FIG. 9 again. After the counter is reset at step S109, the frame line indicating the specific region Pa is displayed and blinks as a cut and zoomed area (zoom area) on the screen of the display unit 21 (step S110). FIG. 10B shows an example of the display screen at this time. FIG. 10B shows that a screen which is not zoomed (hereinafter, referred to as "a full screen") is displayed and the frame line Fl indicating the zoom area is displayed on the screen. As such, in this example, when another view mode is changed to the personal view mode, the specific region Pa is not suddenly enlarged and displayed, but the full screen is first displayed and then the transition to the personal view mode is performed. An enlarged and displayed range is displayed by the frame line on the screen where the full screen is displayed. By this display, a user can easily grasp the transition state of the modes on the screen.

At the time of the transition from another view mode, a time when the full screen is first displayed and a time when the cut and zoomed frame line is displayed may be set to, for example, 0 seconds or 0.5 seconds to 10 seconds or the like.

Figure 10C:
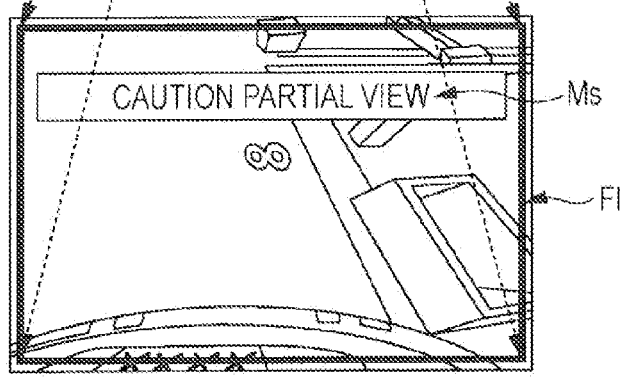

After the frame line Fl indicating the zoom area is displayed and blinks at step S110, zooming starts (step S111), the zoom area and the frame thereof are gradually enlarged and displayed (step S112), and the zooming is finished (step S113). Along with the frame line H, words (message) warning that the displayed picture is a zoomed picture are displayed (step S114). That is to say, the frame line Fl and the picture therein shown in FIG. 10B are gradually enlarged, and finally displayed on the overall screen as shown in FIG. 10C. In addition, the warning message Ms "CAUTION PARTIAL VIEW" is displayed and blinks.

Figure 10D:
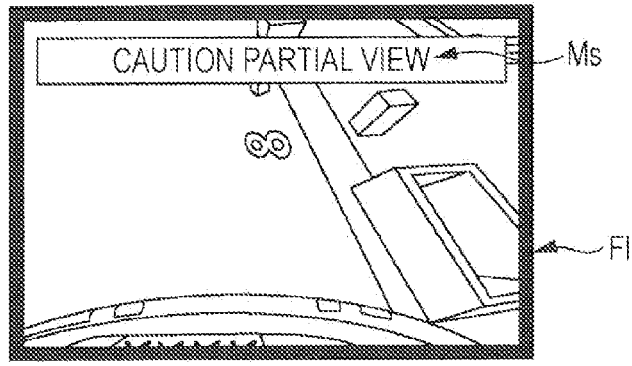

The frame line Fl is at first drawn slightly inside the screen to leave a margin as shown in FIG. 10C. The frame line Fl is displayed slightly inside the full screen, and thereby there can be expectation of an effect that a user intuitively grasps the fact that the image visually extracts, enlarges and displays the specific region Pa. When a display frame only for the screen periphery is formed, it is difficult to mentally grasp the partial enlargement in which the frame is integrated with an image of the surrounding environment or a portion of a frame of the display device, but this can be improved by displaying the inner frame once in this way. In this example, after the display is performed once, the picture in the frame line Fl is displayed on the overall screen as shown in FIG. 10D. The display of the personal view mode is finished at a point of time when a view mode display timer times out (step S115 in FIG. 9) after only a portion of the region is continuously displayed for a long time, and returns to the full screen display according to the normal mode.

A time (zooming time) after the full screen is displayed as shown in FIG. 10B until the specific region Pa is displayed as shown in FIG. 10D or FIG. 10C may set as a parameter of, for example, 0 seconds, or about 0.3 seconds to 10 seconds. The step for varying the zoom magnification towards the enlargement may be set to a value by which a user can determine continuity, for example, an arbitrary value between two steps and 256 steps. A time for displaying and blinking of the warning message Ms may be set to 0 seconds, or 0.5 seconds to an infinite value. A time until the timer, which measures the display time of the personal view mode, times out may be set to 30 seconds to an infinite value.

A Correspondence Example of the Button Operation with the Screen Display

Figure 11A:
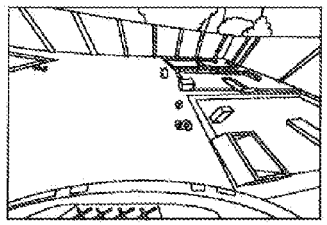
FIGS. 11A to 11L are explanatory diagrams illustrating an example of screen transition when a specific region is set according to an embodiment of the invention.

Next, a correspondence example of an operation input regarding the selection and fixity button B1 and the value input button B2 with the screen display of the display unit 21 will be described with reference to FIGS. 11A to 18C. FIGS. 11A to 11L show in a time series an example of the screen display undergoing a transition when the buttons are operated. To begin with, in the state where a screen of the normal mode (or other display modes) is displayed as shown in FIG. 11A, if simultaneous long pressing of the selection and fixity button B1 and the value input button B2 is detected, interruption is performed and thus there is transition to a screen shown in FIG. 11B.

Figure 11B:
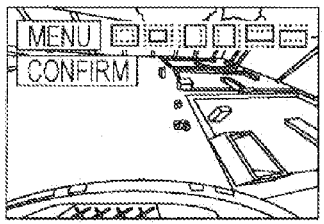

On the screen shown in FIG. 11B, a character string "MENU" is displayed at the top left, and, at the right thereof, an icon indicating enlargement (zoom) and icons indicating the movement of the frame in the X axis direction or Y axis direction are displayed. These icons are displayed so as to facilitate visual understanding of the contents of the menu (personal view mode setting menu). The icons may not be displayed, but only the character string "MENU" may be displayed. A sign "CONFIRM" under the character string "MENU" is for prompting to fix an operation of selecting the menu. Here, if a user presses the selection and fixity button B1, the character string "CONFIRM" is regarded as being selected, and there is transition to a personal view mode setting menu mode (hereinafter, abbreviated to "a setting menu mode").

Figure 12:
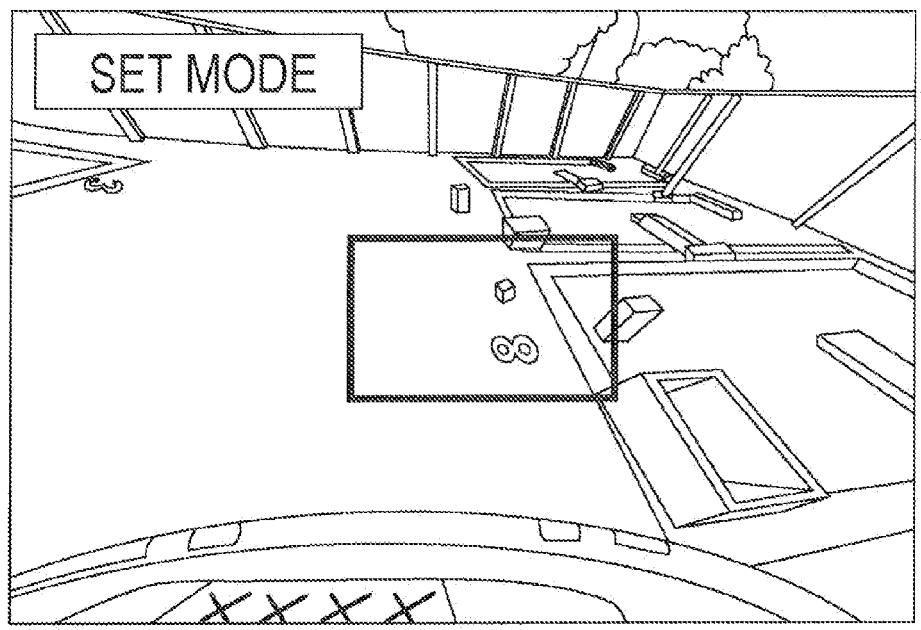
FIG. 12 is an explanatory diagram illustrating a screen display example for prompting to select and fix a mode for setting a specific region according to an embodiment of the invention.

The screen for prompting the fixity of the menu selection operation may display a screen as shown in FIG. 12. In the screen shown in FIG. 12, a character string "SET MODE" is displayed at the top left of the screen and a frame line for deciding the specific region Pa is also displayed. As such, the character string such as "SET MODE" which represents the transition to the setting menu mode so as to be easily understood, and the frame line or the like which symbolizes the personal view mode may be displayed on the screen.

Referring to FIG. 11A to 11L again, if the pressing of the selection and fixity button B1 is detected in the state of displaying the screen shown in FIG. 11B, there is transition to the setting menu mode. Here, when the timer for counting a button fixity waiting time starts as described above and no operation is detected until the timer times out, the setting menu mode is finished.

Figure 11C:
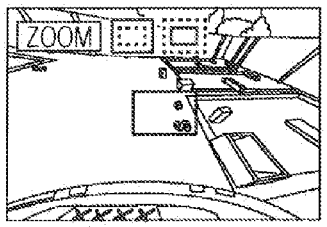

FIG. 11C shows an example of a screen display of the setting menu mode. The character string "ZOOM" is displayed at the top left of the screen, and two icons associated with "ZOOM" are shown at the right thereof. A frame line for deciding the specific region Pa is displayed at the center of the screen. The size of the frame line is in inverse proportion to the zoom magnification, and, at first, the frame line is displayed as the minimum size. When the frame line of the minimum size is selected by a user, an image of the small region surrounded by the frame line is enlarged to the overall screen and displayed. That is to say, the image is enlarged at the maximum zoom magnification.

Figure 13:
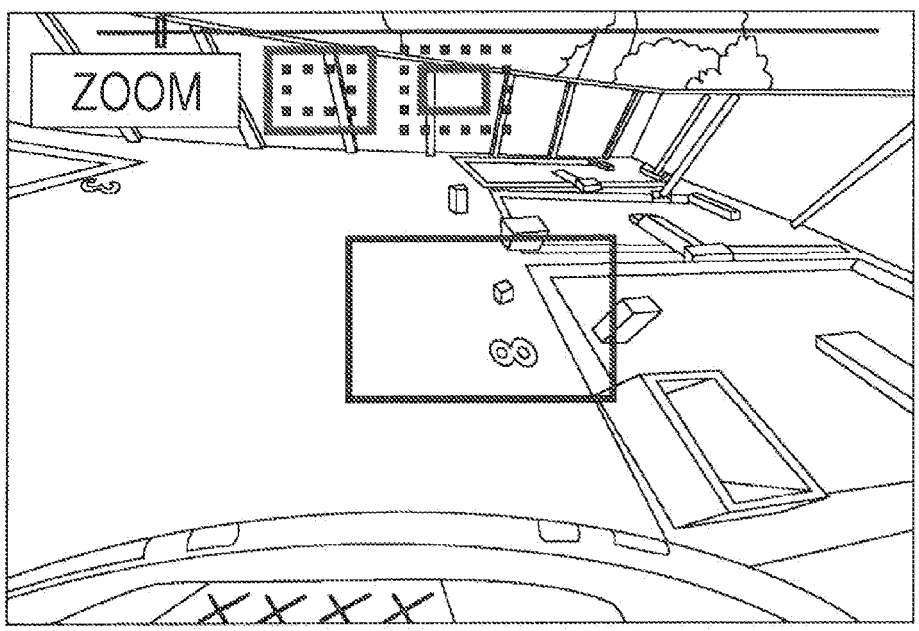
FIG. 13 is an explanatory diagram illustrating a screen display example for setting zoom magnification of a specific region according to an embodiment of the invention.

When the pressing of the value input button B2 is detected in the state of displaying the screen shown in FIG. 11C, the region surrounded by the frame line is enlarged in conjunction with the number of the pressing. This enlargement is performed in the circulated manner as described above, and if the frame line reaches the maximum size of the screen, it is displayed again as the minimum size. In addition, as shown in FIG. 13, in the screen for setting zoom magnification, the zoom magnification may be displayed using a line. A transverse line indicating the zoom magnification is displayed at the top of the FIG. 13, and a longitudinal line indicating the size of the zoom magnification is overlapped with and displayed at the left end part of the transverse line. In this way, the GUI (graphical user interface) which exhibits the zoom magnification to be visually easily understood may be displayed.

Figure 11D:
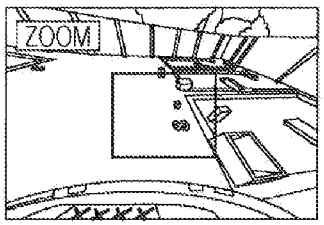

When the pressing of the selection and fixity button B1 is detected in the state of displaying the screen, there is a transition to the screen shown in FIG. 11D. In the screen shown in FIG. 11D, a color of the sign part "ZOOM" is changed, and thus the variation to the fixity of the selection state is represented so as to be visually easily understood. If the zoom magnification is fixed, the screen subsequently undergoes a transition to a screen shown in FIG. 11E.

Figure 11E:
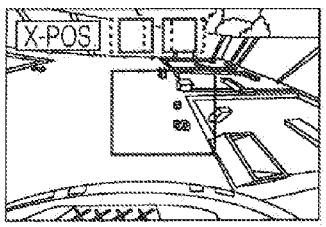
Figure 14:
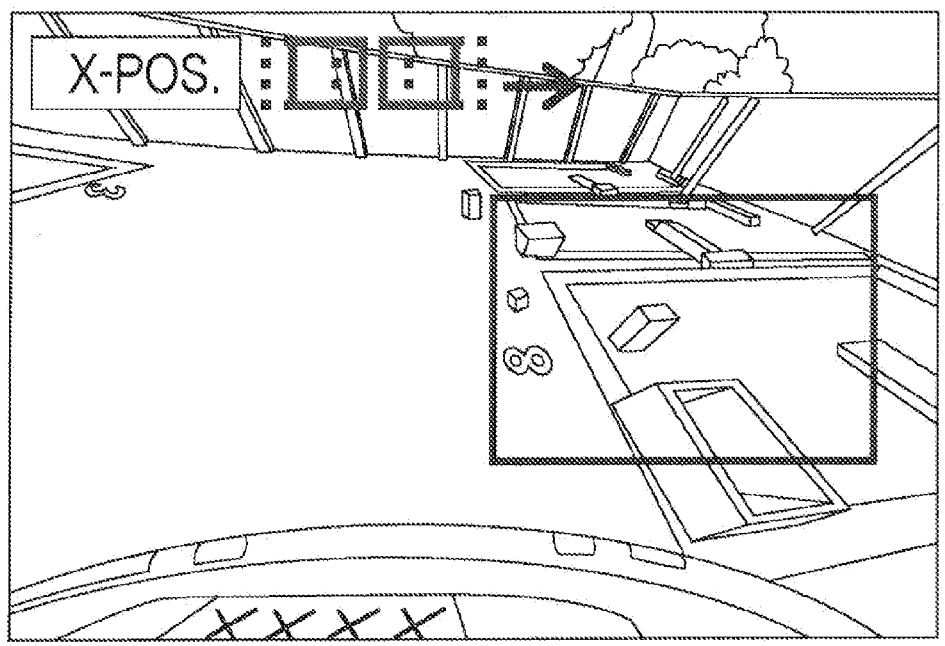
FIG. 14 is an explanatory diagram illustrating a screen display example for setting an X axis coordinate of a specific region according to an embodiment of the invention.

On the screen shown in FIG. 11E, a character string "X-POS." indicating a screen for deciding the X axis coordinate of the specific region Pa and icons representing the decision of the X axis coordinate as images are displayed. A frame line for deciding a position of the X coordinate is also displayed. When the pressing of the value input button B2 is detected in the state of displaying this screen, the region surrounded by the frame line moves rightwards from the center depending on the number of pressings. This movement is also performed in the circulated manner, and if the region reaches the right end of the screen, it moves to the left end thereof, and the region moves rightwards again. As shown in FIG. 14, on the screen for setting the X axis coordinate, the frame line may be displayed in accordance with the arrow indicating a movement direction (in this case, rightwards) of the frame line.

Figure 11F:
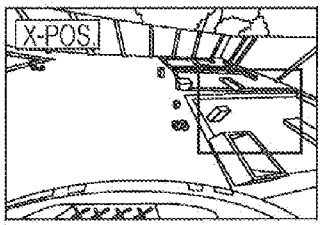

Here, if the position of the X axis coordinate is decided by pressing the selection and fixity button B1, the screen undergoes a transition to a screen shown in FIG. 11F. On the screen shown in FIG. 11F as well, the color of the sign part "X-POS." is changed, and the variation to the fixity of the selection state is represented to be visually easily understood. If the position of the X coordinate is fixed, the screen is subsequently transited to a screen shown in FIG. 11G.

Figure 11G:
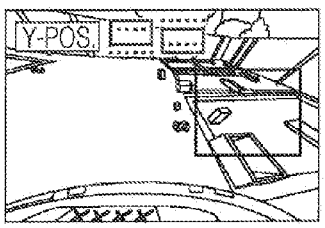
Figure 15:
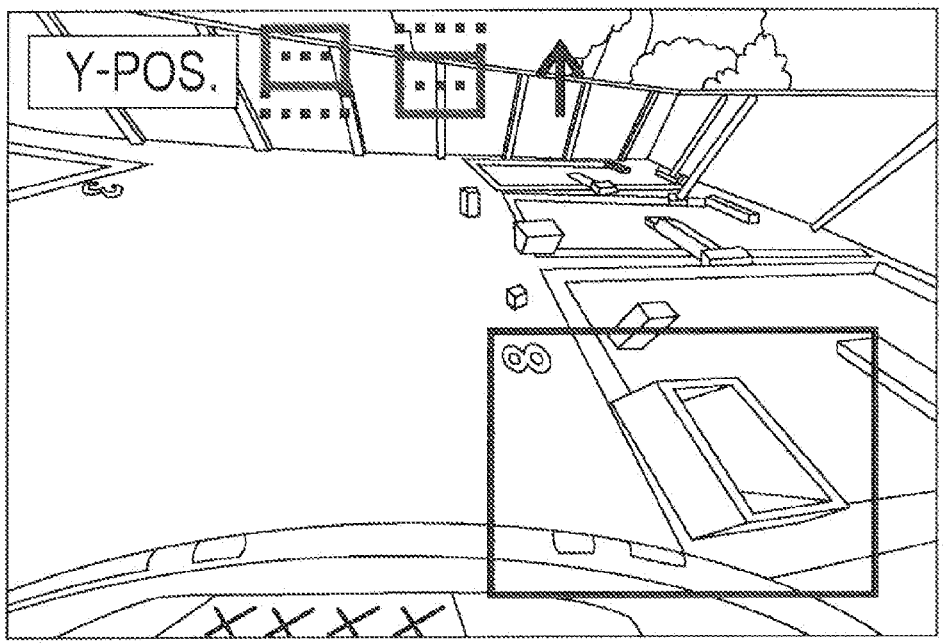
FIG. 15 is an explanatory diagram illustrating a screen display example for setting a Y axis coordinate of a specific region according to an embodiment of the invention.

On the screen shown in FIG. 11G, a character string "X-POS." indicating a screen for deciding the Y axis coordinate of the specific region Pa and icons representing the decision of the Y axis coordinate as images are displayed. A frame line for deciding a position of the Y coordinate is also displayed. When the pressing of the value input button B2 is detected in the state of displaying this screen, the region surrounded by the frame line moves upwards from the center depending on the number of pressings. This movement is also performed in the circulated manner, and if the region reaches the topmost part of the screen, it moves to the bottommost part thereof, and the region moves upwards again. As shown in FIG. 15, on the screen for setting the Y axis coordinate, the frame line may be displayed in accordance with the arrow indicating a movement direction (in this case, upwards) of the frame line.

Figure 11H:
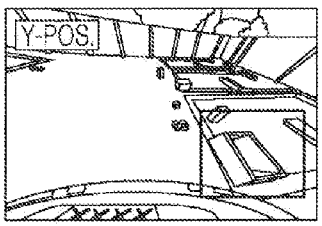

Here, if the position of the Y axis coordinate is decided by pressing the selection and fixity button B1, the screen undergoes a transition to a screen shown in FIG. 11H. On the screen shown in FIG. 11H as well, the color of the sign part "Y-POS." is changed. If the position of the Y axis coordinate is also fixed, the screen undergoes a transition to a screen shown in FIG. 11I. On the screen shown in FIG. 11I, the specific region Pa decided by the zoom magnification, the X coordinate, and the Y coordinate designated by a user are indicated by the frame line, and a character string "OK/NG" is displayed at the top left of the screen. This sign is for prompting whether or not to fix the zoom magnification and the position of the specific region Pa. The values are fixed by pressing the selection and fixity button B1, and are canceled by pressing the value input button 62.

Figure 11I:
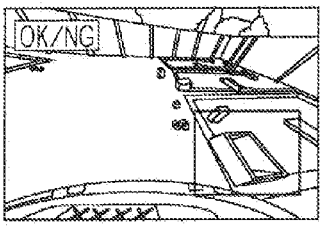
Figure 11J:
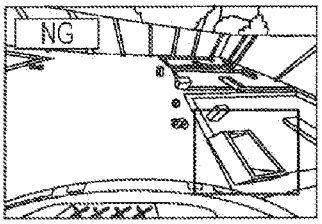
Figure 11K:
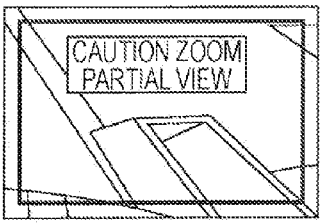
Figure 11L:
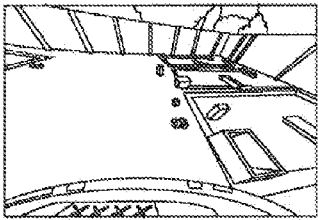

When the selection and fixity button B1 is pressed by a user in the state of displaying the screen shown in FIG. 11I, the screen undergoes a transition to a screen shown in FIG. 11K. In this example, the screen is not suddenly changed, but the zoom magnification is gradually increased and the screen undergoes a transition in a predetermined time. In this way, the situations are consecutively displayed by the gradual transition, and thereby there is an effect that recognition and comprehension of the situation are improved to reduce loss of recognition. A time for the transition may be set as a parameter of about 0.3 seconds to 10 seconds as described above. The parameter may be set to 0 seconds, and, in this case, the screen is instantaneously changed. The step width for varying the zoom magnification towards the enlargement may also be set to an arbitrary value between two steps and 256 steps.

Figure 16:
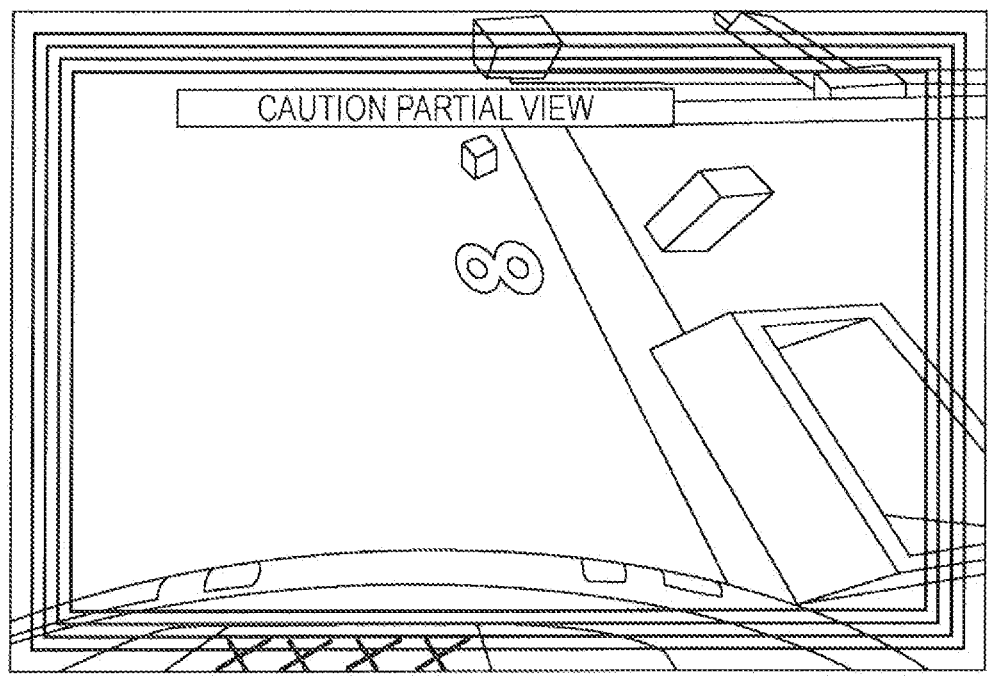
FIG. 16 is an explanatory diagram illustrating a display example of a specific region which is enlarged and displayed according to an embodiment of the invention.

On the screen shown in FIG. 11K, a character string "CAUTION ZOOM PARTIAL VIEW" (warning message) and a surrounding frame are displayed. The character string "CAUTION ZOOM PARTIAL VIEW" and the surrounding frame are for notifying a user that the picture displayed on the screen is not one by the normal mode but an enlarged picture by the personal view mode. For this reason, the color of the frame may be set to a red color or the like. In the case where the surrounding frame is intended to blink, as shown in FIG. 16, a plurality of surrounding frames may be displayed in an overlapping manner. When a plurality of surrounding frames is displayed in the overlapping manner, the lines may sequentially light up and out from the innermost line to the outermost line. This display achieves a visual effect such that the frame is expanded outwards and enables a user to intuitively grasp that the picture surrounded by the frame is a zoomed picture. In order to achieve the same effect, the frames may be displayed so as to be erased one by one from the inner surrounding frame of the plurality of surrounding frames. Alternatively, the plurality of surrounding frames may light up or blink at the same time. Without the surrounding frames, only the warning message may be displayed. Further, the text of the warning message is also not limited to one described above.

In this example, when the capturing system 5 is powered on, a picture by the personal view mode is not displayed, but a picture by other modes, for example, the normal mode or the distant place mode or the like may be displayed. This is because when an enlarged picture by the personal view mode is displayed at the time of being powered on, there is a danger that a user will steer while overlooking the picture which is enlarged and displayed. The picture by other modes is not a picture which enlarges a partial region, but indicates a picture to provide overall comprehension, of which a zooming ratio is adjusted to a degree that the "overall vehicle running directions" can be grasped. A range of "the overall vehicle running directions" is specified by, for example, the width of a vehicle or the like. When a picture by the personal view mode is displayed, such a danger can be prevented by designating as a necessary operation the long pressing operation of the buttons which is purposely performed by a user. However, there may be a setting for displaying an enlarged picture by the personal view mode at the time of being powered on.

As described above, according to the capturing system in this embodiment, for example, a place which is difficult for a user to view is decided as the specific region, based on the instruction inputs by the user. The specific region is cut from a taken image, enlarged, and output to the screen of the display device, by the instruction inputs of the user. In other words, since the user can set a place which is difficult to view uniquely to the user, and view the place by enlargement, the user can confirm in detail a picture of the place which the user intends to view.

Also, since the setting and reading of the specific region Pa are both performed inside the capturing device 1, it is not necessary to perform any process in the display device 2. Therefore, for example, even when a user buys a replacement display device 2, the user can confirm a picture by the personal view mode. In addition, a portion of an image undergoes the cutting conversion process in the capturing device 1, and thereby it can be processed from the original high definition image directly obtained from the image sensor 11 before being carried on a limited image transmission signal band such as the NTSC. Accordingly, since the optimized conversion and the image quality improvement process as the personal view mode are performed, information for a precise and high definition image can be supplied to the display device 2 as compared with a case where a portion thereof is merely cut and enlarged in the display device 2.

Also, according to this example, since, the selection and fixity button B1 and the value input button B2, the setting of the specific region Pa or the reading of the setting values for "display of a place intended to be viewed" can be performed simply by the operation of the two buttons, even if a user is driving or the like, the setting or the reading is completed without unduly taxing the user's hand. Particularly, the reading and enlarging of the specific region Pa can be performed simply by the operation of the selection and fixity button B1 and the consecutive button pressing operation, and thereby the specific region Pa can be easily confirmed in parallel with the driving operation.

In addition, according to this example, the size or the position of the frame line indicating the specific region Pa varies depending on the pressing operation of the value input button B2. When the long pressing of the button for fixing the size or the position of the frame line is received, the setting values for specifying the specific region Pa are generated. Therefore, a user can set the specific region Pa by the simple operation such as varying the size or the position of the frame line without inputting the parameters of the zoom magnification or the X axis coordinate and Y axis coordinate of the specific region Pa.

Also, according to this example, since the specific region Pa can be set in plurality, for example, a place which is difficult to view in a home parking lot, and a place which is difficult to view in a workplace parking lot can be set independently. In addition, since these plural settings can be altered in order and displayed simply by the consecutive button pressing operation of the selection and fixity button B1, even when plural kinds of information are registered, a user can easily confirm the information.

In addition, according to this example, since the surrounding frame and the warning message are displayed on the screen displaying the enlarged specific region Pa, this can easily notify a user that a picture during the viewing is a zoomed picture. Therefore, there can be expectation of an effect that an error or an accident while driving which may occur in a case where a user drives while overlooking the enlarged picture is prevented in advance.

2. A MODIFIED EXAMPLE 1

An Example of Receiving an Operation Using One Button

The embodiment described so far has been described by exemplifying the operation input unit 22 of the display device 2 having the two buttons (the selection and fixity button B1 and the value input button B2), but an operation may be performed using one button. When the operation can be performed using one button, the button has three functions, selection, sequential adding-up, and fixity. Specifically, activation of the personal view mode setting menu and the personal view mode itself, decision of the zoom magnification, and positions of the X axis coordinate and Y axis coordinate, and fixity of the size and position of the specific region Pa are performed by long pressing of the button. In addition, the selection of the zoom magnification, and positions of the X axis coordinate and Y axis coordinate is performed by consecutive button pressing. By this configuration, setting of the specific region Pa and reading of the specific region Pa at the personal view mode can be performed using one button. Thereby, it is possible to increase the area for installing other buttons in the display device 2. In addition, it is not necessary to prepare a plurality of signal lines connected to the display device 2, and thus it is possible to improve the degree of design freedom.

3. A MODIFIED EXAMPLE 2

An Example of Displaying a Picture of the Specific Region Pa on a Small Screen of PinP The embodiment described so far has exemplified that a picture of the specific region Pa is enlarged to the overall screen of the display device 2 and displayed, but the invention is not limited thereto. For example, a picture of the specific region Pa may be displayed on a PinP small screen. A configuration example of a capturing system 5α in this case is shown in FIG. 17.

Figure 17:
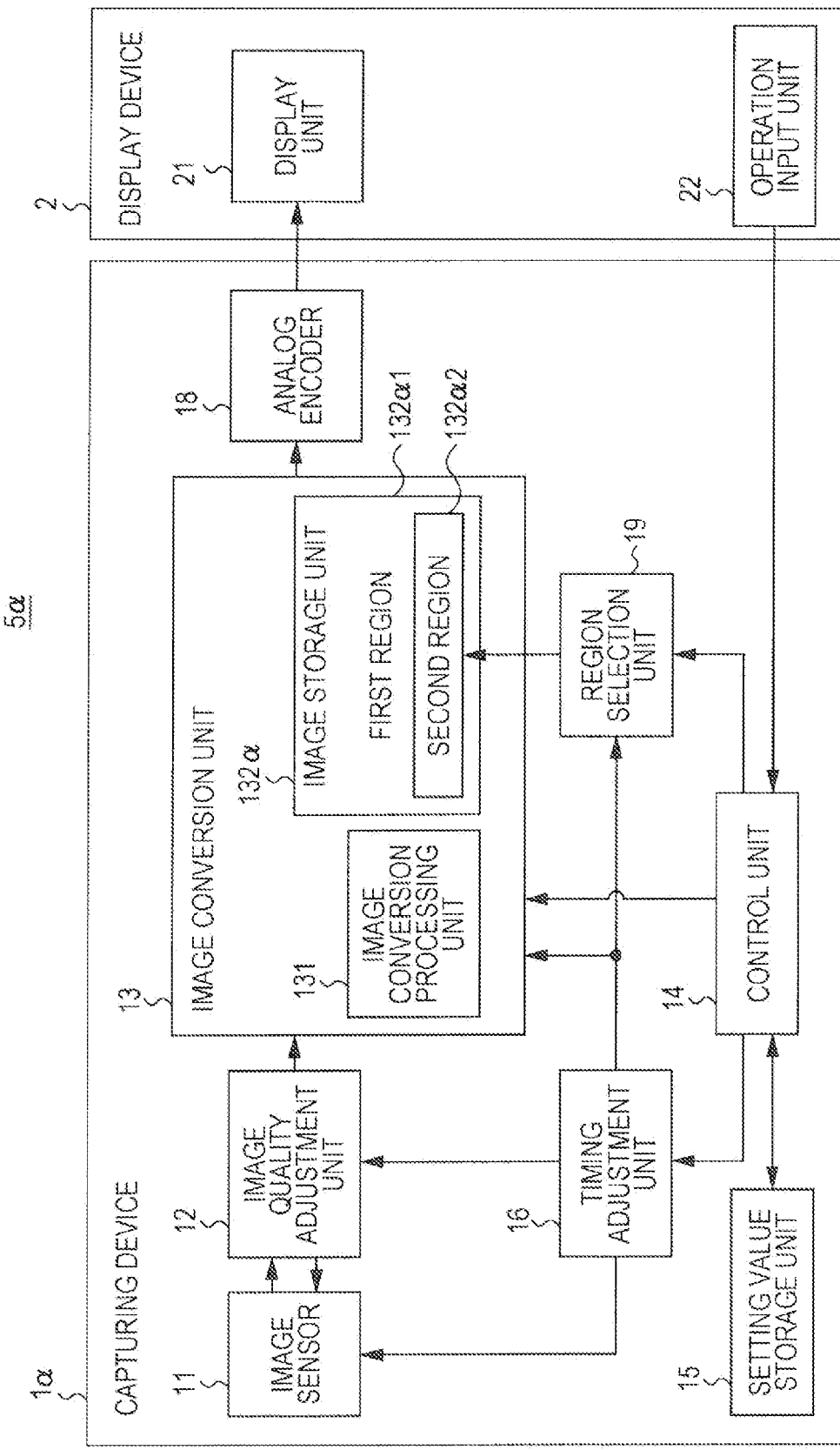
FIG. 17 is an explanatory diagram illustrating a configuration example of a capturing system according to a modified example 1 of an embodiment of the invention.

In FIG. 17, the same reference numerals are given to the elements corresponding to those in FIG. 1, and thus detailed description thereof will be omitted. In the configuration shown in FIG. 17, an image storage unit 132α has a first region 132α1 and a second region 132α2, and there is provided a region selection unit 19 for selecting in which region of the regions an image is written. Converted images used to be output to the overall screen of the display unit 21 are stored in the first region 132α1, and converted images used to be displayed on the PinP small screen are stored in the second region 132α2. The images stored in the image storage unit 132α are all consecutively read according to a frame output timing, and thereby it is possible to obtain image outputs of a PinP output format as an output of the standard output format of the analog encoder 18.

Figure 18A:
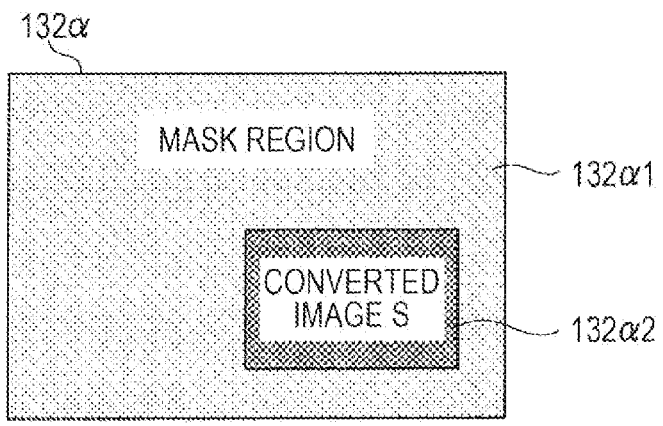
FIGS. 18A to 18C are explanatory diagrams illustrating an example of writing images in an image storage unit according to the modified example 1 of an embodiment of the invention.
Figure 18B:
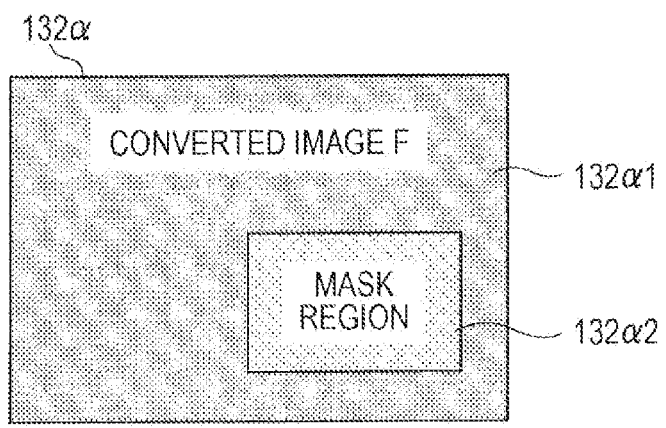
Figure 18C:
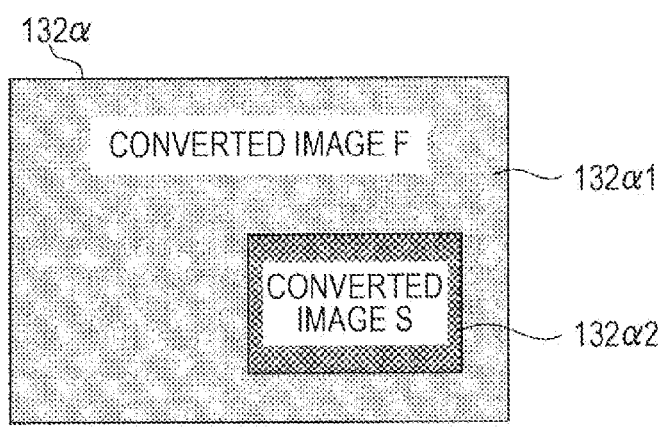

FIGS. 18A to 18C are diagrams illustrating a writing process of the converted images in the first region 132α1 and the second region 132α2. First, as shown in FIG. 18A, a converted image S used to be output to the PinP small screen is written in the second region 132α2. No image is written in the first region 132α1 as a mask region. Next, as shown in FIG. 18B, a converted image F used to be output to the full screen is written in the first region 132α1. The converted image F used to be output to the full screen is generated based on a default image resulting from an image signal generated by the image sensor 11. At this time, no image is written in the second region 132α2 as a mask region. The region selection unit 19 reduces by half the frame rate of each of the converted image F for full screen output and the converted image S for small screen output written in this way, and alternately outputs them for each frame. In other words, each of the converted images is updated once every other frame. By this process, as shown in FIG. 18C, the converted image F for full screen output and the converted image S for small screen output, which are temporally different from each other, are synthesized and output.

By this configuration, for example, it is possible to display a taken picture by the normal mode on the full screen of the display unit 21, and to display a picture of the specific region Pa by the personal view mode on the PinP small screen. Thereby, a user can not only confirm general pictures taken by the capturing device 1α but also confirm enlarged pictures of the specific region Pa. Therefore, it is possible to easily comprehend situations regarding the vicinity of a vehicle. Further, according to the configuration in this example, since the image storage unit 132a is not provided in plurality corresponding to the number of the regions, it is also possible to reduce manufacturing costs of the capturing device 1α.

As shown in FIGS. 17, and 18A to 18C, as well as the configuration where the display control of the PinP screen is performed using one image storage unit 132α, this example may be applied to a configuration where a plurality of image storage units 132α is provided corresponding to the number of the regions. A picture of the specific region Pa by the personal view mode may be displayed not on the PinP small screen but on the full screen, and a picture for overall comprehension may be displayed on the small screen.

It should be understood by those skilled in the art that various modifications, combinations, sub-combinations and alterations may occur depending on design requirements and other factors insofar as they are within the scope of the appended claims or the equivalents thereof.

The invention claimed is:

1. A signal processing device comprising:
   a control unit that generates a setting value for setting a specific region specified from an image resulting from an image signal generated by an image sensor, based on a first instruction input from a user;
   a setting value storage unit that stores the setting value generated by the control unit;
   an image conversion unit that enlarges the specific region specified by the setting value stored in the setting value storage unit, in response to a second instruction input from the user; and
   an output unit that outputs an image signal of the specific region enlarged by the image conversion unit,
   wherein the second instruction comprises sequential user inputs, and
   wherein the control unit includes a timer for detecting a time-out interval during which the sequential user input is not received and for controlling the image conversion unit to enlarge the specific region in accordance with the last-received user input.

2. The signal processing device according to claim 1, wherein the setting value storage unit stores plural setting values for specifying specific regions.

3. The signal processing device according to claim 2, wherein the control unit reads the plural setting values stored in the setting value storage unit so as to be supplied to the image conversion unit, depending on an input number of the second instruction input which is input within a predetermined time after receiving the second instruction input which is input within a predetermined time.

4. The signal processing device according to claim 1, further comprising a display control unit that controls a display unit to display a frame of which a size and a position vary depending on a user input, on the display unit which displays an image resulting from the image signal output by the output unit,
   wherein the control unit generates the setting values based on the size and the position of the frame.

5. The signal processing device according to claim 1, wherein the control unit generates zoom magnification and an X axis coordinate and a Y axis coordinate of the specific region, as the setting values.

6. The capturing device according to claim 1, wherein the display control unit generates a surrounding frame surrounding a periphery of the specific region and/or a warning message for warning that an image displayed as the specific region is an enlarged image, so as to be supplied to the output unit, 7. A capturing system comprising:
   an image sensor that generates an image signal by performing photoelectric conversion for light from a subject;
   a control unit that generates a setting values for setting a a specific region specified from an image resulting from the image signal generated by the image sensor, based on a first instruction input from a user;
   a setting value storage unit that the setting value generated by the control unit;
   an image conversion unit that enlarges the specific region specified by the setting value stored in the setting value storage unit, in response to a second instruction input from the user;
   an output unit that outputs an image signal of the specific region enlarged by the image conversion unit; and
   a display unit that displays an image resulting from an image signal output by the output unit,
   wherein the second instruction input comprises sequential user inputs, and
   wherein the control unit includes a timer for detecting a time-out interval during which the sequential user input is not received and for controlling the image conversion unit to enlarge the specific region in accordance with the last-received user input.

8. A signal processing method comprising the steps of:
   generating a setting value for setting a specific region specified from an image resulting from an image signal generated by an image sensor, based on a first instruction input from a user;
   storing the generated setting value;
   enlarging the specific region specified by the setting value in response to a second instruction input from the user, the second instruction comprising sequential user inputs;

outputting an image signal of the specific region;
detecting a time-out interval during which the sequential user input is not received, and
controlling a process of enlarging the specific region in accordance with the last-received user input.

9. The signal processing device according to claim 1, further comprising a display control unit that controls a display unit to display an image resulting from the image signal,
wherein the display control unit controls the display unit to display an image displayed as the specific region on a sub-screen of picture-in-picture.

10. The signal processing device according to claim 1, further comprising a display control unit that controls a display unit to display an image resulting from the image signal,
wherein the display control unit controls the display unit to display an image displayed as the specific region on a full screen of picture-in-picture and displays an image for providing overall comprehension on a sub-screen.

11. The signal processing device according to claim 1, wherein a default value for specifying a default image at a point of time is used when a view mode display timer times out from when the image conversion unit enlarges the specific region.

12. The signal processing device according to claim 1, wherein the control unit resets a count value of the input number of the second instruction input when the output unit outputs the image signal of the specific region.

13. The signal processing device according to claim 1, further comprising:
the image sensor that generates the image signal by performing photoelectric conversion for light from a subject.

14. The signal processing device according to claim 13, wherein the signal processing device is for being equipped in a car body or a ship body, and
wherein the image sensor generates the image signal by performing photoelectric conversion for light from subjects around the car body or the ship body.

15. The capturing system according to claim 7, wherein the user input unit includes a button, and
wherein the first instruction input and the second instruction, input are performed by pressing of the button.

16. The capturing system according to claim 7, wherein the display unit includes a touch panel, and
a display section of the display unit and the user input unit are integrally formed as the touch panel.

17. The capturing system according to claim 7, further comprising:
a display control unit that converts and synthesizes an image resulting from a signal of the image cropped and enlarged by the image conversion unit and a default image resulting from the image signal generated by the image sensor, so as to be output to a picture-in- picture screen, and
wherein the output unit converts an image signal converted and synthesized. by the display control unit into an image signal of a predetermined format and outputs the converted image signal.

* * * * *